Oct. 22, 1929.                    G. OHAUS                    1,732,612
                                 TRIP SCALE
                             Filed Dec. 4, 1928              2 Sheets-Sheet 1
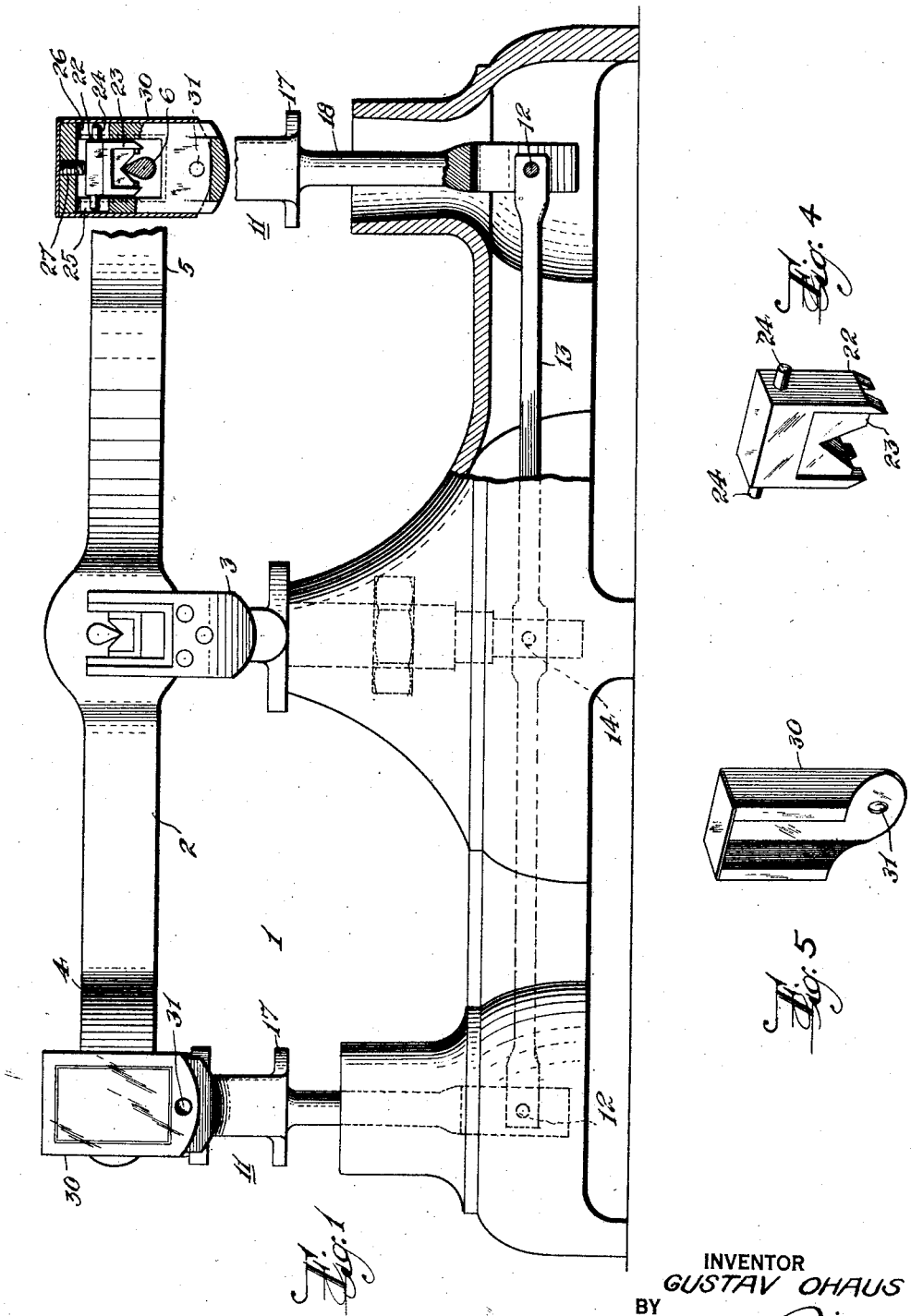
INVENTOR
*GUSTAV OHAUS*
BY
ATTORNEY

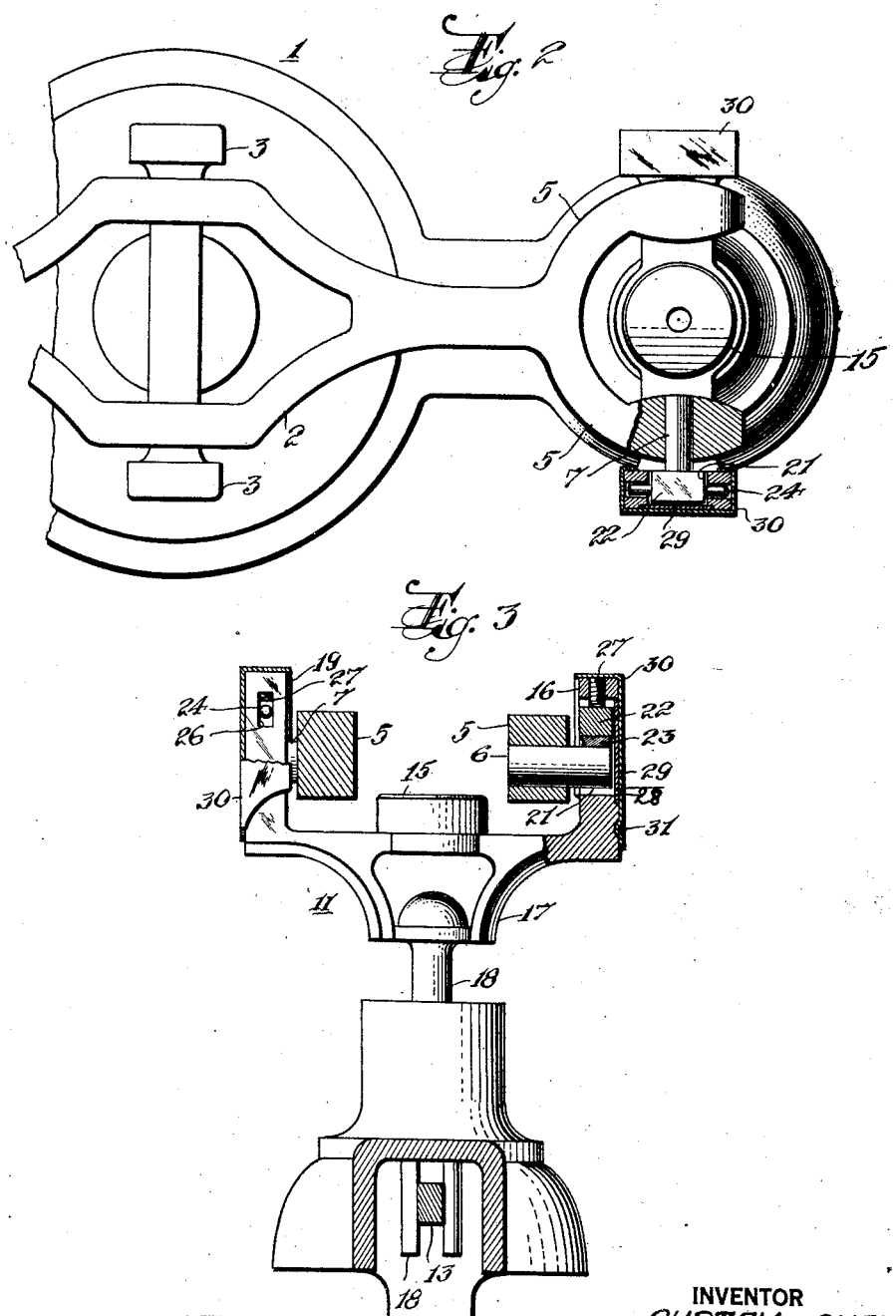

Patented Oct. 22, 1929

1,732,612

UNITED STATES PATENT OFFICE

GUSTAV OHAUS, OF MAPLEWOOD, NEW JERSEY

TRIP SCALE

Application filed December 4, 1928. Serial No. 323,593.

This invention relates, generally, to improvements in weighing scales, and the invention has reference, more particularly, to an improved construction of trip scale.

Scales of this character as heretofore constructed are commonly lacking in sensitivity owing to excessive friction at bearing points caused by inaccuracies in fulcrum distances which inaccuracies are commonly the result of side stress effected by off-center weights upon the scale pans. Accurate correction of the fulcrum distances is impracticable in such scales inasmuch as the adjustable scale yokes can only be adjusted in steps and then only after dismantling the scale.

An object of the present invention is to provide a trip scale wherein the fulcrum distances as determined by the scale yokes may be accurately maintained with a minimum of effort and without the necessity of dismantling the scale.

Another object of the invention is to provide novel means for automatically aligning bearing blocks carried by the scale yokes.

Still another object of the invention lies in the provision of a trip scale of the above character that is extremely sensitive and which is of simple construction and reliable in operation.

Other objects and advantages of the present invention, not at this time more particularly enumerated will be clearly understood from the following detailed description of the same.

The invention is clearly illustrated in the accompanying drawings, in which:—

Fig. 1 is a view in front elevation with parts broken away of a trip scale equipped with the novel trip scale yoke of this invention;

Fig. 2 is a plan view with parts broken away of the structure shown in Fig. 1;

Fig. 3 is a view in end elevation of a portion of the trip scale of the preceding figures;

Fig. 4 is an enlarged perspective view of a bearing and bearing holder;

Fig. 5 is a perspective view of a dust cover for the bearing loop.

Similar characters of reference are employed in all of the hereinabove described views, to indicate corresponding parts.

Referring now to the said drawings, the reference character 1 designates a trip scale as a whole having a trip scale beam 2 fulcrumed upon a post 3. The bifurcated ends 4 and 5 of the scale beam 1 carry hardened knife edges 6 and 7 that support the upper ends of trip scale yokes 11. The lower end portions of trip scale yokes 11 are bifurcated and are pivotally joined by connecting pins 12 to the ends of a lower beam 13 that is pivotally supported midway of its length upon a pin 14 carried by the post 3. For accurate weighing, it is important that the scale beam 2, yokes 11 and lower beam 13 form a true parallelogram regardless of the positions assumed by these members. The scale pans (not shown) are adapted to be mounted upon bosses 15 formed on the trip scale yokes 11.

Each of the trip scale yokes 11 comprises a pair of oppositely arranged bearing loops 16 and 19 joined by a connecting portion 17. A spindle 18 is formed on the connecting portion 17 and extends downwardly and has its bifurcated lower portion pivotally connected by the pin 12 to the lower beam 13. The bearing loops 16 and 19 are similar and are provided with aligned rectangular apertures 21 within which are positioned bearing holders 22 carrying bearing blocks 23 of agate or of other suitable hardened material. Bearing blocks 23 are mounted upon knife edges 6 and 7. A pin 24 extends through an aperture in each bearing holder 22 and is frictionally retained within this aperture. The ends of this pin project outwardly from opposite ends of the bearing holder 22 forming trunnions and these trunnions extend loosely into aligned slots 25 and 26 provided in the bearing loops 16 and 19. Slots 25 and 26 act to retain pins 24 and bearing holders 22 within the bearing loops 16 and 19. Slots 25 and 26 permit considerable vertical movement of the pins 24 with respect to the bearing loops and also a slight transverse movement of these pins with respect to such loops.

Screws 27 are threaded through apertures in the upper ends of the bearing loops 16, 19 and abut the upper surfaces of the bearing holders 22. Screws 27 transmit the thrust of the bearing holders to the scale yokes 11. By adjusting the screws 27 within their apertures in the bearing loops as by means of a screw driver, the fulcrum distance, or the distance between the knife edges 6 and 7 and the connecting pins 12 can be varied at will. The vertical movement of pins 24 within slots 25 and 26 permits of this adjustment. This adjustment is highly important inasmuch as the use of the trip scale and particularly the placing of weights upon the scale pans in off-center positions results in undesired variations in this fulcrum distance which of necessity must be corrected to obtain accurate weighing. Heretofore, the common practise has been to make the spindle 18 in two parts threaded together, and to adjust the fulcrum distance it has been necessary to dismantle the scale and turn the spindle at least one-half turn or if a greater adjustment is necessary a plurality of half turns. Inasmuch as a half turn or a plurality of half turns is usually but an approximate adjustment, the resulting figure defined by the scale beam, lower beam and scale beam yokes is not a true parallelogram, resulting in excessive friction and in inaccurate weighing which is especially noticeable in sensitive balances. By using the novel scale beam yoke of the present invention, the fulcrum distance can be accurately maintained at the required value by merely adjusting the screw 27 to the extent desired and without dismantling the scale. A perfect parallelogram can thus be maintained enabling accurate weighing and eliminating friction at the turning points and the resulting sluggish action common to trip scales.

It is apparent that the bearing holders 22 are free to turn about the pins 24 as axes, to thereby permit complete automatic alignment of the bearing blocks 23 upon the knife edges 6 and 7. This is important since the knife edges 6 and 7 are seldom in exact alignment making the perfect self-aligning feature of the bearing blocks highly desirable in order to avoid end stress and excessive friction at the knife edges.

Rectangular end plates 28 of slightly larger dimensions than the apertures 21 are illustrated as positioned in suitable recesses in the bearing loops 16 and 19 and serve to close the outer ends of apertures 21. Dust covers 30 are positioned upon the bearing loops 16 and 19. Dust covers 30 conform to the bearing loops and are adapted to be slid downwardly over the bearing loops 16 and 19 from above. Each of these dust covers is preferably formed from a unitary piece of a sheet metal and has an inwardly struck boss 31 that is adapted to snap into a corresponding recess, provided in a bearing loop, thereby retaining the dust cover upon the bearing loop. These dust covers, as assembled upon the bearing loops, act to exclude dirt and other foreign matter from the bearing blocks and knife edges and also present a neat and attractive appearance.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:—

1. In a trip scale, in combination, a scale beam, a lower beam, a scale yoke extending between said scale beam and said lower beam, and a bearing block connected to said scale yoke and supported upon said scale beam, said bearing block being adjustable with respect to said scale yoke to thereby vary the distance between the scale and lower beam.

2. In a trip scale, in combination, a scale beam, a lower beam, scale yokes extending between the ends of said scale beam and said lower beam, said members being constructed and arranged so as to form a parallelogram, and bearing blocks carried by said scale beam and connected to said scale yokes, said bearing blocks being adjustable with respect to said scale yokes, to thereby enable connection of any inaccuracy in said parallelogram.

3. In a trip scale, the combination of a scale beam, a lower beam, a scale yoke extending between said scale beam and said lower beam, a bearing block supported upon said scale beam and supporting said scale yoke and screw means coacting with said scale yoke and said bearing block for moving the scale yoke relative to said bearing block, to thereby vary the effective length of said scale yoke.

4. In a trip scale, a scale beam having a knife edge, a lower beam, a scale yoke pivotally connected at its lower end to said lower beam and having a bearing loop at its upper end provided with guiding recesses, a bearing holder positioned within said bearing loop and having trunnions projecting into said guiding recesses, a bearing block attached to said bearing holder and resting upon the knife edge of said scale pan, and screw means threaded through said bearing loop and engaging said bearing holder for moving said scale yoke with respect to said bearing block and said knife edge, to thereby vary the distance between said knife edge and the point of connection of said scale yoke with said lower beam.

5. In a trip scale, a scale beam, a lower beam arranged parallel to said scale beam, a scale yoke extending between said scale beam and said lower beam, said scale yoke being pivotally connected at its lower end to an end of said lower beam, a bearing loop provided at the upper end of said scale yoke, a bearing holder positioned within and slidably connected to said bearing loop, means for slidably adjusting said bearing holder with respect to said bearing loop, and a bearing block contained within said bearing holder and resting upon an end of said scale beam, said adjusting means serving to vary the distance between said bearing block and the connections of said scale yoke with said lower beam, to thereby maintain said scale beam and lower beam in true parallelism.

6. In a trip scale, a scale beam, a lower beam arranged parallel to said scale beam, a scale yoke extending between said scale beam and said lower beam, said scale yoke being pivotally connected at its lower end to an end of said lower beam, a bearing loop provided at the upper end of said scale yoke, a bearing holder positioned within and slidably connected to said bearing loop, a screw threaded through said bearing loop and engaging said bearing holder for slidably adjusting said bearing holder with respect to said bearing loop, a bearing block contained within said bearing holder and resting upon an end of said scale beam, said adjusting screw serving to vary the distance between said bearing block and the connection of said scale yoke with said lower beam, to thereby maintain said scale beam and lower beam in true parallelism, and a cover mounted upon said bearing loop and enclosing said adjusting screw to protect the latter from unauthorized use.

7. In a trip scale, a scale yoke having a bearing loop, a bearing contained within said bearing loop and a dust cover for housing said bearing loop and protecting said bearing from foreign matter, said dust cover being slidable into or out of operative relation with respect to said bearing loop and having means for frictionally engaging said bearing loop to thereby retain said dust cover upon said bearing loop.

In testimony, that I claim the invention set forth above I have hereunto set my hand this 28th day of November, 1928.

GUSTAV OHAUS.